United States Patent
Arai

(10) Patent No.: US 8,284,441 B2
(45) Date of Patent: Oct. 9, 2012

(54) IMAGE FORMING APPARATUS FOR ENLARGED DIVISIONAL PRINTING

(75) Inventor: Hiroyuki Arai, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1204 days.

(21) Appl. No.: 11/828,787

(22) Filed: Jul. 26, 2007

(65) Prior Publication Data

US 2008/0037038 A1    Feb. 14, 2008

(30) Foreign Application Priority Data

Aug. 9, 2006  (JP) .................................. 2006-216759

(51) Int. Cl.
- *G06K 15/02* (2006.01)
- *G06K 15/00* (2006.01)
- *G03G 21/00* (2006.01)

(52) U.S. Cl. ...... 358/1.2; 358/1.12; 358/1.13; 358/1.18; 399/357

(58) Field of Classification Search .................. 399/357
See application file for complete search history.

(56) References Cited

U.S. PATENT DOCUMENTS

| | | | | |
|---|---|---|---|---|
| 5,233,923 A * | 8/1993 | Fuchi | ............................. | 101/425 |
| 6,247,808 B1 * | 6/2001 | Ma et al. | ....................... | 347/100 |
| 6,414,755 B1 * | 7/2002 | Bronstein et al. | ............ | 358/1.15 |
| 6,470,154 B1 * | 10/2002 | Shinohara | ....................... | 399/71 |
| 2002/0036665 A1 * | 3/2002 | Shima | ............................... | 347/5 |
| 2003/0185588 A1 * | 10/2003 | Takami et al. | ................ | 399/111 |
| 2005/0105925 A1 * | 5/2005 | Yang et al. | ...................... | 399/45 |
| 2007/0002095 A1 * | 1/2007 | Ozawa et al. | ................... | 347/37 |
| 2007/0002379 A1 * | 1/2007 | Momose | ........................ | 358/1.18 |
| 2007/0008397 A1 * | 1/2007 | Maebashi | ...................... | 347/158 |
| 2007/0019220 A1 * | 1/2007 | Miyazaki et al. | ............ | 358/1.12 |
| 2007/0201098 A1 * | 8/2007 | Morales et al. | .............. | 358/3.26 |

FOREIGN PATENT DOCUMENTS

| | | |
|---|---|---|
| JP | 3402963 | 2/2003 |
| JP | 2004-325492 | 11/2004 |
| JP | 2006-221006 | 8/2006 |

OTHER PUBLICATIONS

Notice of Reasons for Refusal issued in Japanese Patent Application No. 2006-216759, dated Feb. 8, 2011, along with English translation (4 pages).

* cited by examiner

*Primary Examiner* — Vincent Rudolph

(74) *Attorney, Agent, or Firm* — Finnegan, Henderson, Farabow, Garrett & Dunner, L.L.P.

(57) ABSTRACT

An image forming apparatus to set full breed printing automatically in case enlarged divisional printing is set.

3 Claims, 6 Drawing Sheets

IMAGE FORMING APPARATUS FOR ENLARGED DIVISIONAL PRINTING

This application is based on Japanese Patent Application No. 2006-216759 filed on Aug. 9, 2006, in Japanese Patent Office, the entire content of which is hereby incorporated by reference.

BACKGROUND OF THE INVENTION

The present invention relates to an image forming apparatus such as a copying machine, a printer and a facsimile machine.

There has been known an image forming apparatus capable of so called enlarged divisional printing wherein in case of forming an image on a sheet by enlarging image data of a document, if the enlarged image data of the document becomes larger than the size of the sheet, the image data is divided and formed on a plurality of the sheets (for example Patent Document 1). Thereafter a plurality of the sheets on which divided images are formed are jointed by a user to obtain an enlarged image.

[Patent Document 1] Tokkai 2004-325492

In case an enlarged image is formed by jointing a plurality of the sheets, it is required for adjacent sheets that on one sheet, an overlap width has to be provided at a side to be jointed with an adjacent sheet, and on the other sheet, an image has to be formed to the edge of the sheet. If the image is formed by ordinary page margin printing where page margins are always formed, the page margins are formed at four sides of the sheet, thus the unnecessary page margins have to be cut away before jointing.

In such case, full breed printing which forms the image to the very edge of the sheet is required. However, full breed print is usually configured to be selected by a user for the reasons below. Thus if the user misses to select full breed printing the unnecessary page margins are created at four sides which have to be cut away.

In full breed printing, since the image forming involves toner running off the edges of the sheets, the transfer member tainted by the toner running off has to be cleaned. Thus productivity is deteriorated compared to page margin printing. Therefore, for full breed printing, let the user select the full breed printing so as to confirm the user's will which accepts full breed printing though the productivity is deteriorated.

SUMMARY OF THE INVENTION

The present invention has been achieved in view of the above problems, and object of the present invention is to provide a superior convenience to the user when enlarged divisional printing is carried out.

The above-mentioned problems are solved by the followings.

An image forming apparatus capable of enlarged divisional printing wherein an image is formed by enlarging and dividing image data into a plurality of pages of image data, and of full breed print wherein the image is formed to a very edge of a sheet, image forming apparatus, having: an input section to set enlarged divisional printing; and a control section to set full breed print in case the enlarged divisional printing is set through the input section.

DETAILED DESCRIPTION OF THE PREFERRED EMBODIMENT (Configuration of Apparatus)

Figure 1:
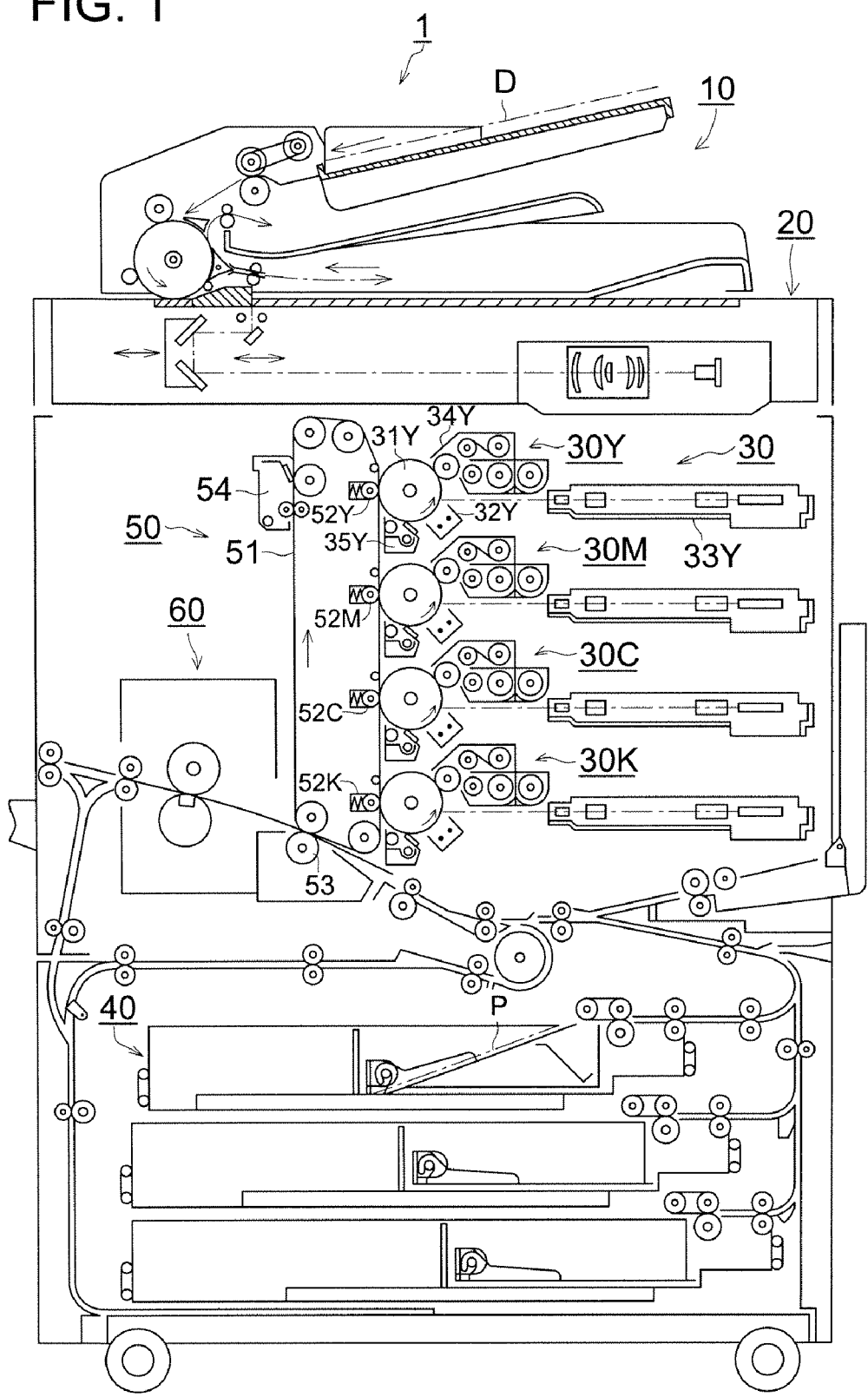
FIG. 1 is a configuration diagram of an image forming apparatus of the present embodiment.

FIG. 1 is a configuration diagram of an image forming apparatus related to the present embodiment. Image forming apparatus 1 is configured with document conveyance section 10, image read-in section 20, image forming section 30, sheet feeding section 40, transferring section 50 and fixing section 60.

Document conveyance section 10 conveys documents one by one to image read-in section 20.

Image read-in section 20 reads an image of document D conveyed from document conveyance section 10 and outputs image data.

Image forming section 30 is provided with image forming sections 30Y, 30M, 30C and 30K for four colors to carry out full color image forming. Image forming section 30Y is provided with charging device 32Y, exposing device 33Y, developing device 34Y and cleaning device 35Y at a circumference of photoconductive member 31Y. A surface of photoconductive member 31Y is charged by charging device 32Y, exposed by exposing device 33Y based on the image data outputted from image read-in section 20 and developed by developing device 34Y, thereby a toner image is formed on the surface of the photoconductive member 31Y. The toner image is transferred onto a sheet through transferring section 50. Residual toner on the surface of the photoconductive member 31Y after transferring is cleaned by cleaning device 35Y. Image forming sections 30M, 30C and 30K have the same structures as above.

Sheet feeding section 40 feeds sheet P towards transferring section 50.

Transferring section 50 transfers a toner image carried by the surface of photoconductive member 31 of image forming section 30 onto sheet P fed from sheet feeding section 40. Transferring section 50 is provided with intermediate transfer belt 51, primary transfer rollers 52Y, 52M, 52C and 52K, secondary roller 53 and cleaning device 54. The toner images carried on the surfaces of photoconductive members 31Y, 31M, 31C and 31K are transferred onto intermediate transfer belt 51 through primary transfer rollers 52Y, 52M, 52C and 52K, thereafter the toner image is transferred onto sheet P through secondary transfer roller 53. Intermediate transfer belt 51 and secondary transfer roller 53 are equivalent to the image carrier and the transfer roller of the present invention respectively.

Fixing section 60 fixes the toner image by heating and pressing sheet P on which the toner image conveyed from transfer section 50 is formed. Sheet P on which the image is fixed is discharged to outside the apparatus.

(Configuration of Control)

Figure 2:
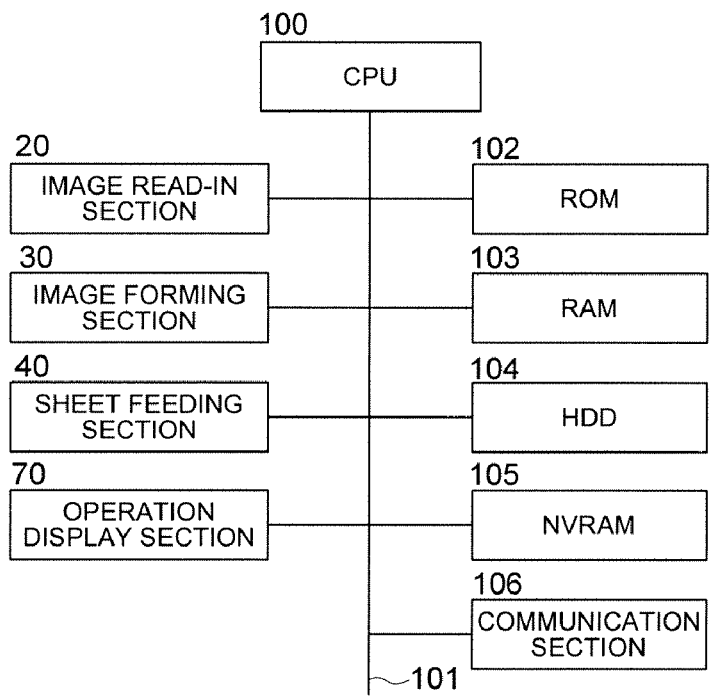
FIG. 2 is a configuration diagram of control of an image forming apparatus of the present embodiment.

FIG. 2 is a control configuration diagram of the image forming apparatus related to the present embodiment. Control subjects not related to the present invention specifically are omitted.

In the image forming apparatus 1, with CPU 100 which executes various controls of image forming apparatus 1 in accordance with programs as a center, ROM 1, ROM 2, RAM 103, HDD 104, NVRAM 105, image read-in section 20, image forming section 30, sheet feeding section 40, operation display section 70 and communication section 1 are connected each other via bus 101. CPU 100 is equivalent to the control section of the present invention.

ROM 102 memorizes various programs and data for CUP 100 to execute control of image forming apparatus 1 using these programs and data.

RAM 13 is used by CPU 100 as a work area and memorizes necessary programs and the data temporally for CPU to execute controls.

HDD 104 memorizes image data inputted from image read-in section 20 or image data inputted from external devices such as personal computers via communication section 106.

NVRAM 105 memorizes various settings which an user or a service man resisters. A page margin and an overlap width in enlarged divisional printing are memorized here.

Image forming section 30 forms an image on the sheet fed from sheet feeding section 40 based on image data inputted from image read-in section 20 or image data inputted from external devices such as personal computers via communication section 106.

Operation display section 70 is configured with a touch panel to display various operation screens to which various instructions are inputted. By inputting of the user through operation display section 70, settings of enlarged divisional printing and full bleeding printing are carried out. Operation display section 70 is equivalent to input section of the present invention.

Communication section 106 is connected with an external network and receives image data inputted from personal computers.

(Control)

<Control of Enlarged Divisional Printing>

Figure 3:
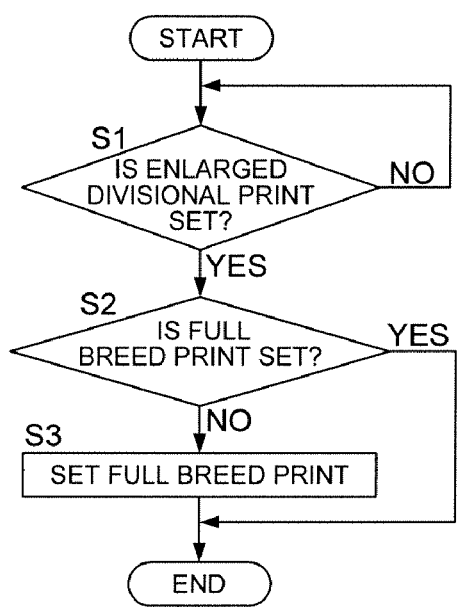
FIG. 3 is a control flow chart of enlarged divisional printing setting process related to the present embodiment.

FIG. 3 is a control flow chart of enlarged divisional printing. CPU 100 executes the enlarged divisional printing based on a program memorized in ROM 102.

CPU 100 judges whether or not enlarged divisional printing is set in operation display section 70 (Step S1). In case enlarged divisional printing is set (Step S1: Yes), the flow proceeds to step S2.

Next, CPU 100 judges whether full bleed printing is set or not (Step S2).

If full bleed printing is set, (Step S2: Yes), CPU 100 terminates the flow.

If full bleed printing is not set, (Step S2: No), CPU 100 set full bleed printing (Step S3), and thereafter terminates the flow.

As above, according to the present embodiment, in case enlarged divisional printing is set, full bleed printing is also automatically set and the page margins at four sides of the sheet are not created, thus it is not necessary to remove the unnecessary page margins at the sides when the divisional prints are jointed each other. Therefore, it can provide enhanced convenience to users.

<Cleaning Process of the Secondary Transfer Roller>

Figure 4:
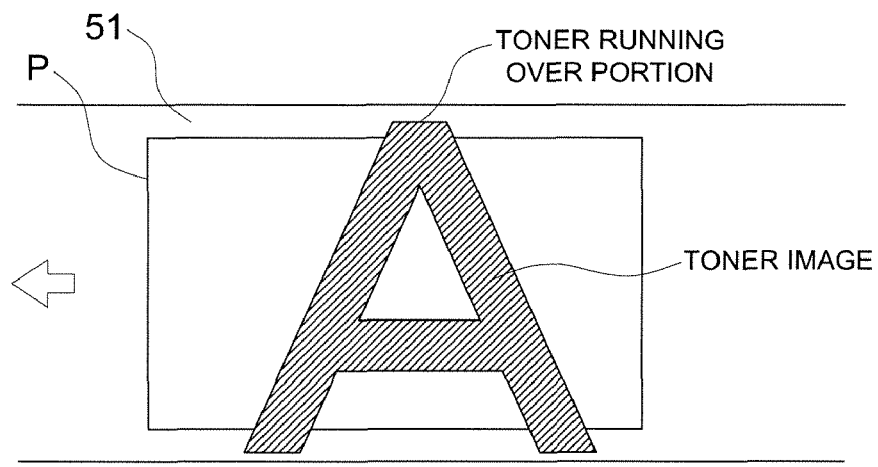
FIG. 4 is a schematic diagram showing a relation between sheet P on intermediate transfer belt 51 and a toner image in full bleed printing.

FIG. 4 is a schematic diagram indicating a relationship between a toner image and sheet P on intermediate transfer belt 51 in full bleed printing.

In full bleed print, as FIG. 4 shows, the toner image is formed while running off the edge of sheet P, since the image is formed to the very edge of the sheet P. The toner runs off the edge of the sheet P adheres on intermediate transfer belt 51, and contacts with secondary transfer roller 53 then adheres on it. If the toner adheres on the secondary transfer roller 53, it will taint the back surface or edge of subsequent sheet P. Thus the secondary transfer roller 53 needs to be cleaned.

Figure 5:
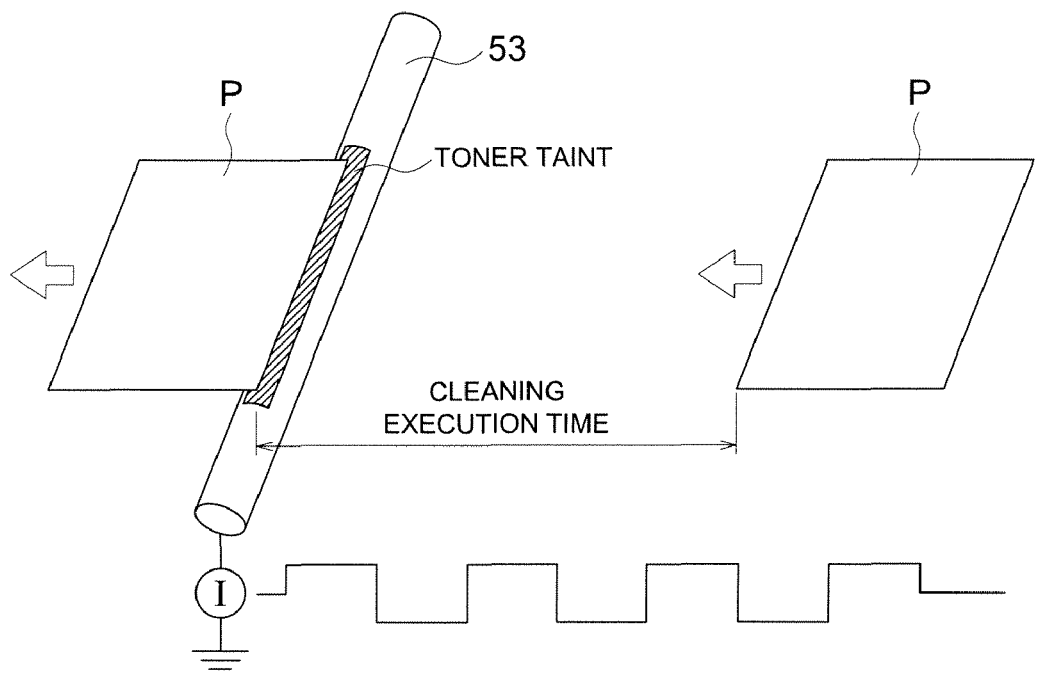
FIG. 5 is a schematic diagram of cleaning operation for secondary transfer roller 53.

FIG. 5 is a schematic diagram of execution of cleaning of secondary transfer roller 53. Cleaning is executed by forming an alternative electric field between secondary transfer roller 53 and intermediate transfer belt 51 within a period of time which is from a precedent sheet passing through secondary roller 53 to a successive sheet passing through secondary roller 53. Thereby, by transferring the toner adhering on secondary transfer roller 53 to intermediate transfer belt 51, cleaning of secondary roller 53 is carried out. This is equivalent to a cleaning device of the present invention. For example, a positive bias is applied in a first revolution of secondary transfer roller 53 and a negative bias is applied in a second revolution of secondary transfer roller 53. Applying of the positive bias and the negative bias represents one cycle. In FIG. 5, for example, shows 3.5 cycles of cleaning operation. Meanwhile, when the alternative electric field is formed, a direct current electric field can be overlapped so that the toner adhering on secondary transfer roller 53 can be easily transferred to intermediate transfer belt 51.

The more often the alternative electric field is applied, the more clearly second transfer roller 53 is cleaned. However, contrarily, the more often the alternative electric field is applied, the longer the time of cleaning is required, thus the time span between preceding sheet P and succeeding sheet P has to be larger. For example, if a roller diameter of secondary transfer roller 53 is 30 Ømm, a circumference of the roller is about 90 mm and one cycle is about 180 mm. As FIG. 5 shows, if the cleaning operation is 3.5 cycle, it becomes 630 mm, thus the distance between the sheets has to be more than 630 mm (In case of page margin printing where the cleaning operation is not carried out, the distance between the sheets is, for example, about 60 mm). As a result, a productivity is considerably decreased.

In the present embodiment, the cleaning conditions differ for full bleed printing where enlarged divisional printing is carried out and for full bleed printing where enlarged divisional printing is not carried out so that trade-off between cleaning ability of secondary roller 53 and the productivity is optimized.

In case of enlarged divisional printing, since a final print form is composed by jointing a plurality of the sheets, only an obverse side of the sheet is printed and the reverse side is not printed. Thus, the quality of the reverse side of the sheet is not necessary to be considered. Also, the user recognizes that jointing lines by jointing the sheets are unavoidable and does not care about taint of jointing edges of the sheets and change of conditions of the joint. Therefore, the quality of the edge does is not necessary to be considered.

Therefore, in case of full breed printing where enlarged divisional printing is carried out, number of repeat times of the alternative electric field for cleaning is set less, compare to that of full breed printing where enlarged divisional printing is not carried out so as to carry out control where a priority is given to the productivity. For example, in full breed printing where enlarged divisional printing is not carried out, 3.5 cycles of cleaning operation is carried out, contrarily, 1.5 cycle of cleaning operation is carried out for full breed printing where enlarged divisional printing is carried out.

Figure 6:
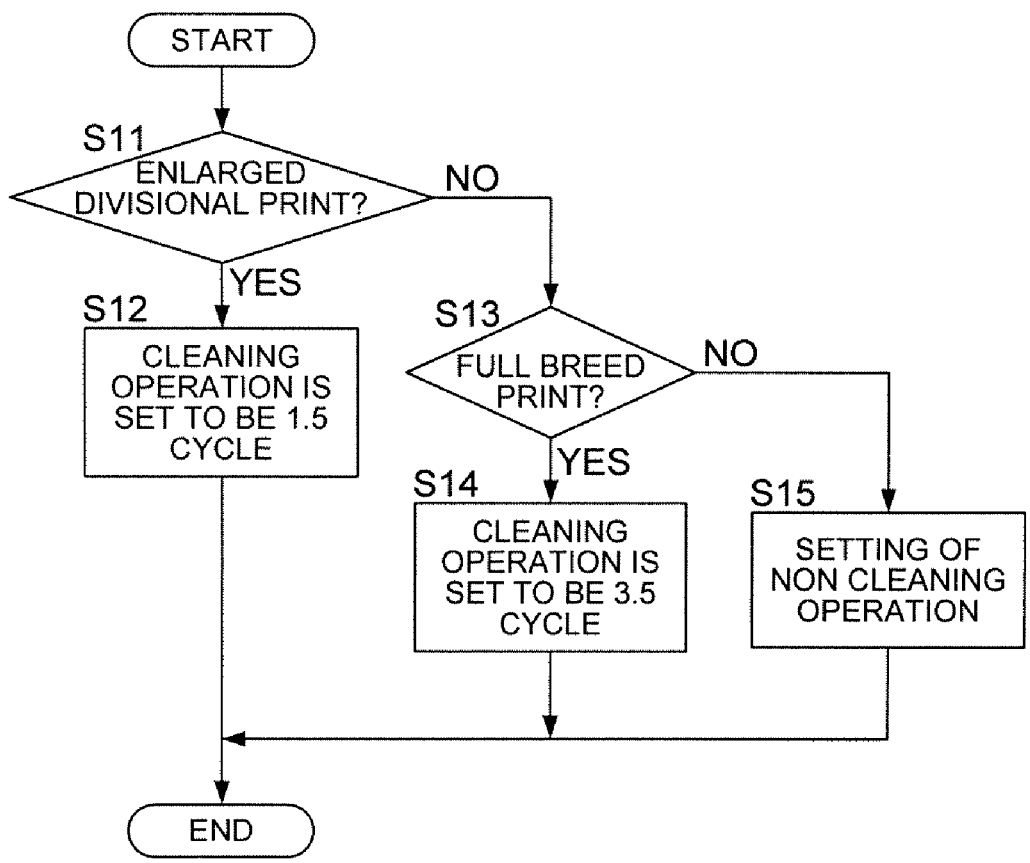
FIG. 6 is a flow chart of setting of cleaning operation for the secondary transfer roller related to the present embodiment.

FIG. 6 is a setting flow of execution of cleaning of a secondary transfer roller related to the present embodiment. The setting for execution of the present cleaning is carried out by CPU 100 based on the program memorized in ROM 102.

First, CPU 100 judges whether enlarged divisional printing is set or not (Step S11: Yes), and CPU 100 sets cleaning operation to be 1.5 cycle (Step S12).

When enlarged divisional printing is judged that it is not set (Step S11: No), whether or not the full bleed printing is set is judged (Step S13). In this case, full breed printing where enlarged divisional printing is not carried out, is set by direct operation of the user through operation display section 70.

If full breed printing is judged to be set (Step S13: Yes) CPU 100 set cleaning operation to be 3.5 cycles (Step S14).

If full breed printing is judged not to be set (Step S13: No), CPU 100 set cleaning operation not to be carried out (Step: S15).

As the above, according to the present embodiment, in full bleed printing where enlarged divisional printing is carried out, because the quality of sheet such as taint at the reverse side and the edged is not necessary to be considered, the number of repeat times of the alternative electric field for cleaning is set less, compare to that of full breed printing where enlarged divisional printing is not carried out so as to shorten the cleaning time and to give the priority to the productivity. Thus the convenience for user is realized.

<Setting Process of Execution of Cleaning for Each Page in Enlarged Divisional Printing>

In the aforesaid secondary transfer roller cleaning process, for enlarged divisional printing, full breeding printing is automatically set and cleaning operation is set 1.5 cycle without exception, however, in the present process, cleaning operation differs for each page to improve the productivity further. Specifically, for a page where toner image is not formed at front end and rear end of the sheet p (for page margin or for overlap width), cleaning operation is not carried out for a period of time after sheet P of the page passes through the secondary transfer roller 53 and before a succeeding sheet P reaches to secondary transfer roller 53.

Figure 7:
FIG. 7 is a schematic drawing of setting of cleaning execution of each page in the enlarged divisional printing.

FIG. 7 is a schematic diagram of setting of execution of cleaning for each page in enlarged divisional printing related to the present embodiment. In FIG. 7, a case where an image is formed by dividing an image data into nine sheets is shown as an example. By placing and jointing nine pieces of the sheets on which the image is formed as the figure, an enlarged image can be obtained. In each page, image forming is carried out along a sheet conveyance direction according to the page order, shown by the figure.

In pages 1 to 6, since the toner image is formed to very edge of at least front or rear end, the toner running off the side of sheet P across a longitudinal direction of secondary transfer roller 53 adheres on the surface of secondary transfer roller 53. The toner running off adheres on the reverse surface of the succeeding sheet P and creates line-shaped taint in a direction perpendicular to the conveyance direction of succeeding sheet P. Thus, as described above, in the cleaning of the secondary transfer roller, 1.5 cycles of cleaning operation is carried out in the period of time after sheet P of each page passes through the secondary transfer roller 53 and before succeeding sheet P reaches to secondary transfer roller 53.

On the other hand, in pages 7 to 9, since there are areas such as the overlap width or the page margin where the toner image does not exist, at both front and rear end, the toner does not adhere on secondary transfer roller 53 and the line-shaped taint is not created in the direction perpendicular to the conveyance direction of succeeding sheet P. Therefore, the cleaning is not carried out in the time period after sheet P passes through the secondary transfer roller 53 and before succeeding sheet P reaches to secondary transfer roller 53.

Meanwhile, in pages 7 and 8, as figures shows, the toner image is formed to very edge of right end of sheet P and a slight taint is caused on a right end surface of succeeding sheet P, however, as above mentioned, in enlarged divisional printing, the quality of the edge is not necessary to be considered and it does not appear much, compared to the line shaped taint on the reverse surface. Thus it is acceptable even if the cleaning is not carried out.

Figure 8:
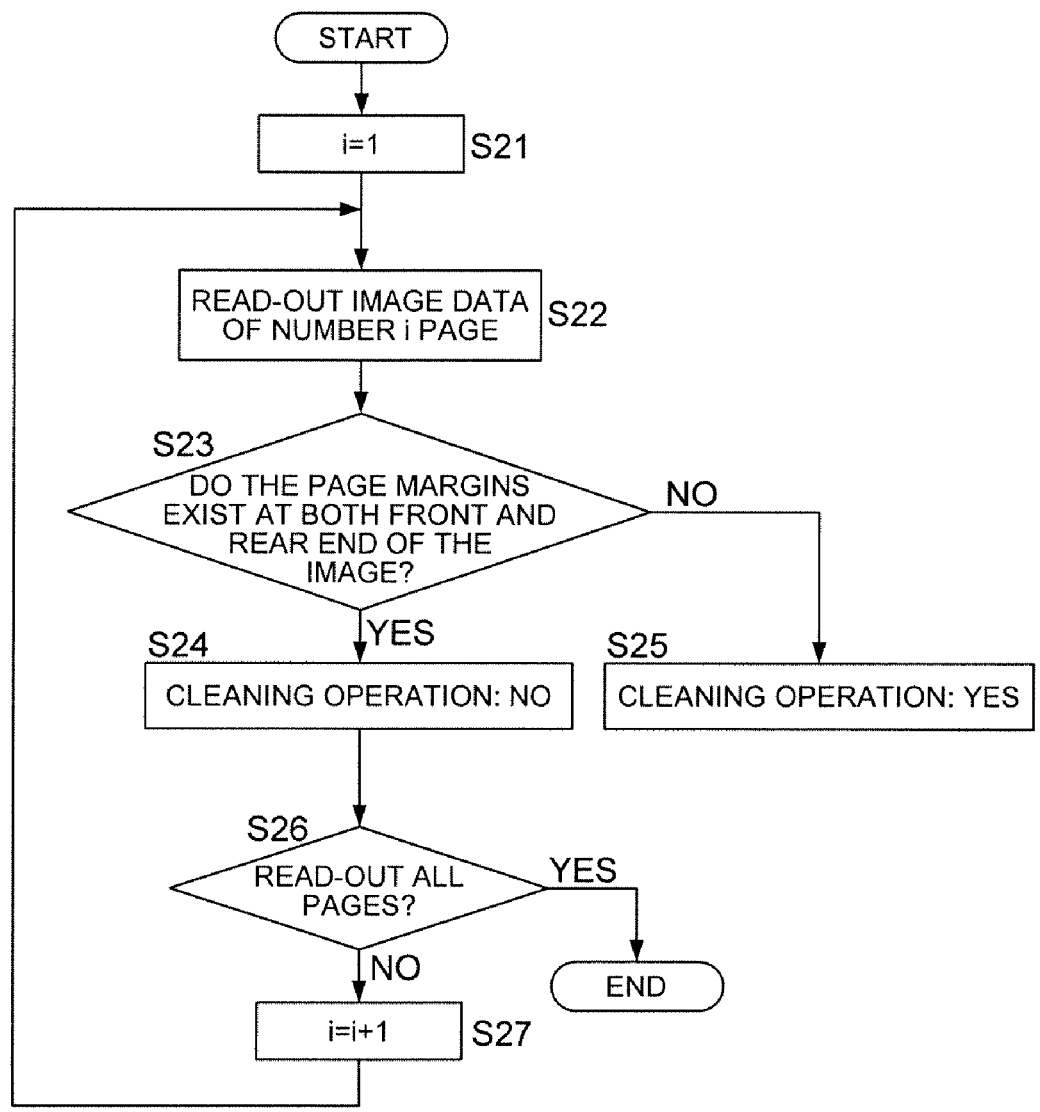
FIG. 8 is a flow chart of setting of cleaning execution for each page in the enlarged divisional printing.

FIG. 8 is diagram of a flow chart of setting execution of cleaning for each page in enlarged divisional printing related to the present invention. The setting of execution of cleaning is executed by CPU 100 based on the program memorized in ROM 102. Meanwhile, it is assumed that enlarged divisional printing is set through operation display section 70, and the divided image data corresponding to each page is already created, also it is assumed that image data for each page is provided with the page margins or the overlap widths at the positions shown by FIG. 7. Size of the overlap width provided is determined by a value memorized in NVRAM 105 in advance. The image data divided for each page is memorized in HDD 104 after it is created.

First, CPU 100 sets i=0 as an initial value (Step S21).

Next, CPU 100 reads-out image data of page i from HDD 104 (Step S23).

Next, CPU 100 judges whether or not a page margin (including an overlap width) exists at front and rear end of the image (Step S23).

If CPU judges that the page margin exists at both front and rear ends of the image (Step S23: Yes), CPU 100 sets the page as "cleaning operation: No" (Step S24).

If CPU judges that the page margin does not exist at front or rear ends, namely, the image is formed at least either front end or rear end of the image (Step S23: No), CPU 100 sets the page as "cleaning operation: Yes" (Step S25).

Next, CPU 100 judges whether or not the all pages are read-out (Step S26).

When CPU 100 judges that the all pages are read-out (Step S26: Yes), CPU 100 terminates the flow. If CPU 100 judges that the all pages are not read-out (Step S26: No), CPU 100 makes i=i+1 (Step S27) thereafter, the flow returns to step S22 and read-out a subsequent page. Thereby, steps S23 to S26 are repeated and execution or non-execution of cleaning operation is set for each pages.

Then, based on setting of execution or non-execution of cleaning operation for each page, execution of cleaning after secondary transfer of each page is determined.

As the above, according to the present embodiment, in a page where the toner image does not exist at both front and rear end of the sheet P, the cleaning is not carried out in the time period after sheet P of the page passes through the secondary transfer roller 53 and before succeeding sheet P reaches to secondary transfer roller 53, thereby the productivity is further improved and convenience for user can be realized.

In the present embodiment, while enlarged divisional printing or full breed printing is set through operation display section 70, in case image data of the document is inputted from a personal computer via communication section 106, settings of enlarged divisional printing and full breed printing are carried out via communication section 106. In this case, communication section 106 is equivalent to an input section of the present invention.

In the present embodiment, as the cleaning section, the alternative electric field is formed between secondary transfer roller 53 and intermediate transfer belt 51, then the toner adhering on the secondary transfer roller 53 is transferred to intermediate transfer belt 51, however an other roller to clean secondary transfer roller 53 can be disposed opposite to secondary transfer roller 53, and an alternative electric field can be formed between both rollers so that the toner adhering secondary transfer roller 53 can be transferred to the other roller. Further, in this case, it is not limited to the roller, it can be a brush.

In the present embodiment, while the image forming apparatus using intermediate transfer belt 51 is described as the example, the present invention can be applied to an image forming apparatus having a configuration wherein transfer is performed directly from a photoconductive member to the sheet. In this case, the photoconductive member is equivalent to an image carrier of the present invention.

In the present embodiment, while enlarged divisional printing setting process, secondary transfer roller cleaning process and cleaning execution setting process for enlarged divisional printing for each page are conducted by the same CPU 100 (equivalent to control section of the present invention), individual CPUs can conduct. Namely, the control section of the present invention can be configured with a plurality of control sections.

According to the present embodiments, in cease enlarged divisional printing is set, full bread printing is automatically set, therefore it is prevented that in page margin printing, the page margins are formed at four sides of the sheet on which the image is formed, thereby it is not necessary to cut off the unnecessary page margins. Therefore a superior convenience can be provided to the user.

What is claimed is:

1. An image forming apparatus capable of enlarged divisional printing wherein an image is formed by enlarging and dividing image data into image data of a plurality of pages, and full breed print wherein the image is formed to a very edge of a sheet, the image forming apparatus, comprising:
    an input section for setting the enlarged divisional printing;
    a control section for automatically setting the full breed print in case the enlarged divisional printing is set through the input section;
    an image carrier for carrying a toner image;
    a sheet feeding section for feeding the sheet on which the toner image is transferred;
    a transfer roller for transferring the toner image on the image carrier onto the sheet; and
    a cleaning section for cleaning the transfer roller,
    wherein the control section controls the cleaning section to execute cleaning of the transfer roller after the transfer roller transfers the toner image onto the sheet and before the transfer roller transfers the toner image onto a succeeding sheet in a way that a cleaning time in full breed printing, where enlarged divisional printing is set, is shorter than the cleaning time in full breed printing, where enlarged divisional printing is not set.

2. The image forming apparatus of claim 1, wherein cleaning is carried out by forming an alternative electric field between the transfer roller and the image carrier.

3. The image forming apparatus of claim 1, wherein when the enlarged divisional printing is set, the control section creates the image data of a plurality of pages by dividing the image data, and judges whether or not page margins exist at front and rear ends of the created image data of each page in the sheet conveyance direction, and then controls cleaning so that cleaning is not executed for the image data of the page, in case the control section judges that the page margins exist at front and rear ends.

* * * * *